(12) United States Patent
Pearson et al.

(10) Patent No.: US 11,300,223 B2
(45) Date of Patent: Apr. 12, 2022

(54) SELF-CLEANING WATER PASSAGEWAYS ON DIAPHRAGM INSERT

(71) Applicants: James E. Pearson, Downers Grove, IL (US); Paul Charles Berkley, Shorewood, IL (US); Shane Duncan Bartow, Streamwood, IL (US); Kenneth A. Bergbauer, Bartlett, IL (US)

(72) Inventors: James E. Pearson, Downers Grove, IL (US); Paul Charles Berkley, Shorewood, IL (US); Shane Duncan Bartow, Streamwood, IL (US); Kenneth A. Bergbauer, Bartlett, IL (US)

(73) Assignee: Robertshaw Controls Company, Itasca, IL (US)

( * ) Notice: Subject to any disclaimer, the term of this patent is extended or adjusted under 35 U.S.C. 154(b) by 83 days.

(21) Appl. No.: 16/213,778

(22) Filed: Dec. 7, 2018

(65) Prior Publication Data
US 2020/0182370 A1    Jun. 11, 2020

(51) Int. Cl.
| F16K 31/40 | (2006.01) |
| F15B 13/04 | (2006.01) |
| F16K 31/385 | (2006.01) |
| E02F 9/22 | (2006.01) |

(52) U.S. Cl.
CPC ........ *F16K 31/404* (2013.01); *F15B 13/0401* (2013.01); *F16K 31/385* (2013.01); *E02F 9/2285* (2013.01); *F15B 2211/6355* (2013.01)

(58) Field of Classification Search
CPC .. F16K 31/404; F16K 31/385; F16K 31/3855; F16K 31/402; F15B 13/0401; F15B 2211/6355; E02F 9/2285
See application file for complete search history.

(56) References Cited

U.S. PATENT DOCUMENTS

| 5,887,848 A * | 3/1999 | Wilson ...................... E03D 3/06 |
| | | 137/550 |
| 6,076,550 A * | 6/2000 | Hiraishi .............. F16K 31/0655 |
| | | 137/550 |
| 7,093,529 B2 * | 8/2006 | Farrell ................ F04B 27/0878 |
| | | 29/888.04 |

(Continued)

FOREIGN PATENT DOCUMENTS

GB          2 296 075 A      6/1996

*Primary Examiner* — Craig J Price
*Assistant Examiner* — Andrew J Rost
(74) *Attorney, Agent, or Firm* — Reinhart Boerner Van Deuren P.C.

(57) ABSTRACT

A valve is disclosed a valving member positioned in an internal valving cavity and operable to control a flow of water therethrough. The valving member includes a diaphragm and an insert. A passageway through the diaphragm communicates with a bleed slot, preferably a tapered bleed slot, and a scallop of the insert. The scallop cooperates with the diaphragm to form a bleed holes when the valving member is in a closed position. The diaphragm and the insert at least partially separate when the valving member is opened to expose the bleed slot and scallop. The diaphragm rolls up to contact the insert when the valving member is closed to create a wiping action to flush any trapped debris from the bleed slot.

20 Claims, 4 Drawing Sheets

(56) References Cited

U.S. PATENT DOCUMENTS

| | | | |
|---|---|---|---|
| 8,960,638 B2* | 2/2015 | Da Pont | F16K 31/404 251/129.15 |
| 9,033,305 B2* | 5/2015 | Schreier | F16K 31/408 251/30.03 |
| 9,366,358 B2* | 6/2016 | Da Pont | F16K 31/404 |
| 2014/0145103 A1* | 5/2014 | Bush | F16K 31/406 251/324 |
| 2017/0082210 A1* | 3/2017 | Ok | F16K 31/404 |
| 2017/0321811 A1* | 11/2017 | Hashimoto | F16K 31/52408 |
| 2017/0363224 A1* | 12/2017 | Quinn | F16K 31/404 |

* cited by examiner

SELF-CLEANING WATER PASSAGEWAYS ON DIAPHRAGM INSERT

FIELD OF THE INVENTION

This invention generally relates to pilot operated water valves, and more particularly to systems and methods to reduce bleed hole clogs in diaphragm inserts and water valves incorporating same.

BACKGROUND OF THE INVENTION

Pilot operated water valves use passageways to allow water to flow to separate chambers formed by a diaphragm inside the water valve's internal cavity to aid in opening and closing of the water valve. Because water in an outlet chamber on one side of the diaphragm is pressurized at the same pressure as that of the water in an inlet chamber on the other side of the diaphragm, and assuming the pressure of the valve outlet is less than that of the inlet chamber, the combined effect is to keep the diaphragm seated against the main valve seat to keep the valve closed.

In order to open the pilot operated water valve, a pilot passageway leading from the outlet chamber to the valve outlet is opened by a small solenoid lifting the sealing member exposing the pilot passage. The water in the outlet chamber then proceeds to evacuate from the outlet chamber through the pilot passageway to the outlet. While water will flow into the outlet chamber due to the pressure differential on either side of the diaphragm, the rate at which water is evacuated through the pilot passageway exceeds the ability of the water to refill the outlet chamber, the pressure in the inlet chamber will exceed that of the pressure in the outlet chamber. This pressure differential thus causes the diaphragm to unseat from the main valve seat, thereby fully exposing the opening surrounded by the main valve seat to the inlet chamber. This results in a full opening of the water valve allowing water to flow from the inlet chamber to the outlet.

To close the pilot operated water valve, the pilot passageway is closed when the sealing member closes the pilot passage by de-energizing the solenoid. Water from the inlet chamber flowing through the diaphragm via the passageways then accumulates in the outlet chamber at the pressure of the inlet. This results in a pressure differential across the diaphragm that aids in closing the valve.

As should now be clear, proper operation of the pilot operated water valve requires that water be able to freely flow through the passageways of the diaphragm. That is, if the passageway from the inlet chamber to the outlet chamber becomes clogged, the water valve will not be able to operate properly.

Unfortunately, most pilot operated water valves use a bleed hole as the passageway through the diaphragm between the inlet chamber and the outlet chamber. Molded diaphragm inserts presently have a center hole forming the pilot passageway and a single bleed hole that forms the passageway to allow water to enter the outlet chamber to equalize pressure across the diaphragm as discussed above. However, the bleed hole may become clogged. Bleed hole clogs can be caused by a number of issues, including contaminants in the water, a phenomenon known as window-paning, etc. Window-paning occurs when water in a water valve is allowed to dry and leftover minerals form a skin over the bleed hole. Such clogs are a problem as they prevent water from entering the outlet chamber, causing the valve to operate incorrectly.

In order to reduce the likelihood of such bleed hole clogs, manufacturers of pilot operated water valves began using multiple bleed holes to reduce the chances of having a single bleed hole clog cause malfunction of the valve. The thought with having multiple bleed holes is that if one bleed hole gets clogged, then there is at least one other bleed hole to allow the flow of water across the diaphragm. However, if there are contaminants in the water that cause a clog in one bleed hole, it is likely that all the bleed holes will become clogged eventually.

In many pilot operated water valves, a rigid insert is used along with the diaphragm. In some of these valves, when the valve is closed, the diaphragm contacts the sides and/or upper edge of the insert, and the bleed holes through the diaphragm communicate with the outlet chamber via bleed slots formed in the side and/or bleed holes in the upper edge of the insert. This allows the bleed holes in the diaphragm to be larger to reduce clogging risk therein, while the size of the bleed slots and/or bleed holes regulate the water flow between the inlet chamber and the outlet chamber. Unfortunately, there is still a high likelihood of clogs because contaminants in the water can build up in the bleed slots and/or in the bleed holes in the upper edge of the insert for the same reasons discussed above.

Therefore, there is still a need in the art for a pilot operated water valve having a diaphragm and diaphragm insert that is able to clear out contaminants from passageways to prevent clogs. Embodiments of the present invention provide such a pilot operated water valve having self-cleaning water passageways that enable continued operation of the pilot operated water valve despite the presence of contaminates in the water. These and other advantages of the invention, as well as additional inventive features, will be apparent from the description of the invention provided herein.

BRIEF SUMMARY OF THE INVENTION

In view of the above, embodiments of the present invention provide a new and improved pilot operated water valve having a self-cleaning water passageway that overcomes one or more of the problems described above. More particularly, embodiments of the present invention provide a new and improved self-cleaning water passageway in a pilot operated water valve that substantially reduces bleed hole clogs that may lead to valve failure. Still more particularly, embodiments of the present invention provide a new and improved self-cleaning water passageway that creates a self-cleaning action to dislodge any contaminants from the bleed slot. Still more particularly, embodiments of the present invention provide a new and improved self-cleaning water passageway that creates a wiping action that clears away any contaminants in the water passageway. In certain embodiments the new and improved self-cleaning water passageway terminates in a bleed hole formed by a scallop in an upper edge of the insert cooperating with the diaphragm itself when closed. When opened, the scallop and the diaphragm separate to allow clearance of any trapped debris that would otherwise operate to cause failure in a pilot operated water valve.

In one aspect, the invention provides a pilot operated water valve incorporating the self-cleaning water passageway that includes an insert with a bleed slot, preferably a tapered bleed slot with a large bottom and a narrower top. In embodiments having tapered bleed slots, the increasing taper of the bleed slot allows in-rushing water to accelerate as it moves towards to narrower top of the bleed slot. This increases the force with which the water exits through a bleed hole, which is located at the top of the bleed slot, causing the water to flush out any contaminants that may have become stuck in the bleed hole.

In another aspect, the invention provides a pilot operated water valve incorporating the self-cleaning water passageway includes a diaphragm with an unrolling feature. The unrolling feature of the diaphragm creates a two-step cleaning process. The first cleaning step is a self-cleaning action. Once the armature is activated, the water pressure against the diaphragm will cause it to lift and begin the unrolling action. As the diaphragm lifts, the insert will begin to lift above the diaphragm as it is unrolled from contact with the side of the insert. As it does so, part of the passageways in the insert are now exposed to the water in the outlet chamber. This exposure allows any contaminants that had become lodged therein to be flushed out of the passageway and free to exit through the pilot passageway in the insert.

By utilizing the unrolling feature of the diaphragm, the second cleaning step is a wiping action during the valve closing process. Once the armature is deactivated, the pilot passageway is closed and water flows through the passageways and into the outlet chamber. As the diaphragm rolls up and closes, the wiping action as the water accelerates through the passageways between the diaphragm and insert again clears away any contaminants in the passageway.

In yet another aspect, the invention provides a pilot operated water valve incorporating the self-cleaning water passageway that includes a bleed hole formed by an internal wall of the diaphragm contacting a scallop located at the top of a bleed slot, on the upper edge of the insert. This allows the two halves or portions of the bleed hole to be separated and to open the bleed hole for cleaning. In the case that a bleed slot is not powerful enough to flush out a bleed hole clog, separating the two halves or portions of the bleed hole will allow the clog to be cleared out.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the Drawings, there are illustrated various embodiments of the pilot operated water valve having self-cleaning bleed slots and holes in accordance with the teachings of the present invention. While such embodiments will be described herein, those skilled in the art will recognize that such embodiments are provided by way of example and not by way of limitation. Indeed, other embodiments of the present invention, for example using different process fluids than water, will become apparent to those skilled in the art from the following description and attached figures, and all rights are reserved therein.

Figure 1:
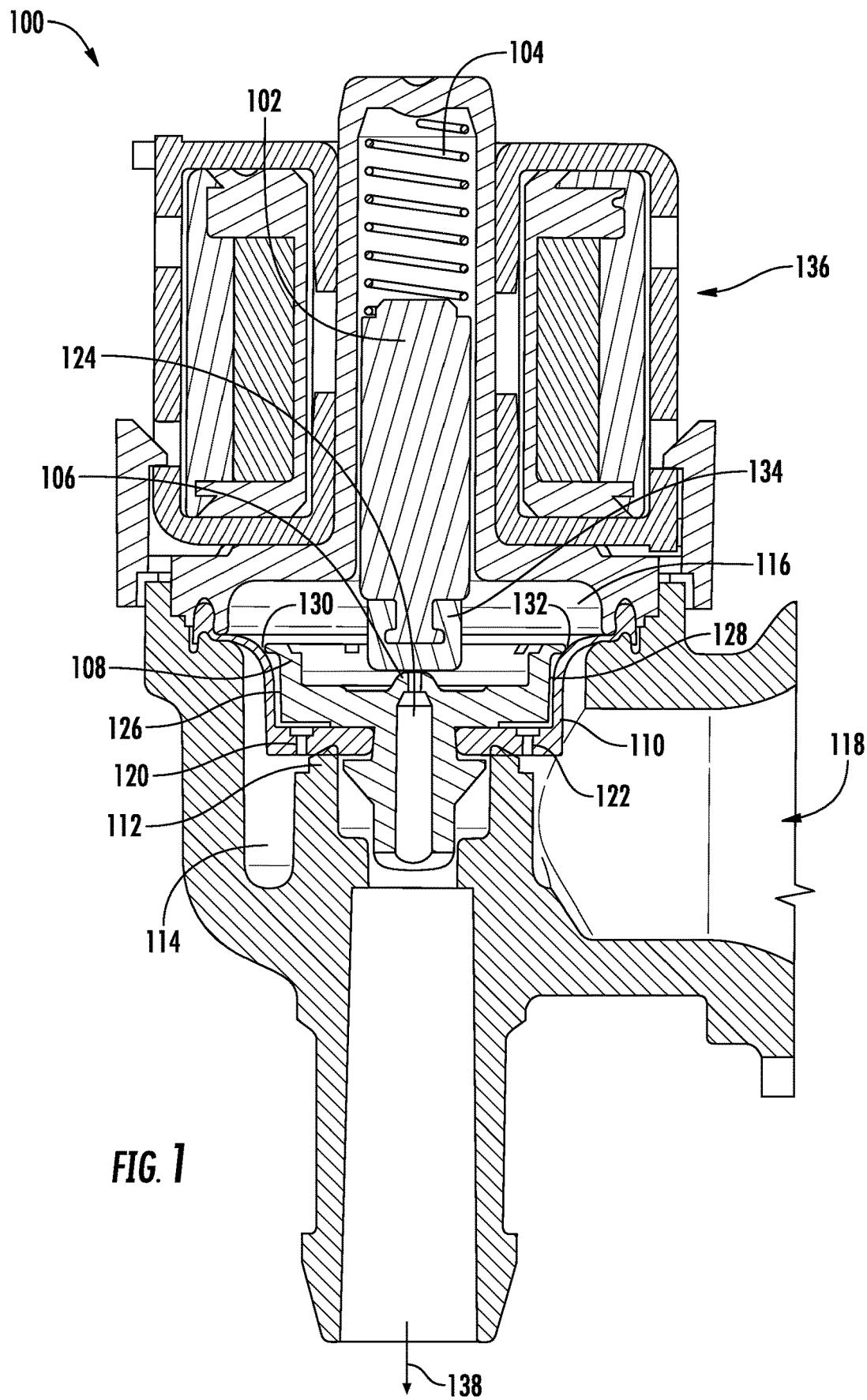
FIG. 1 is a cross section illustration of an embodiment of a pilot operated water valve useful in consumer appliances constructed in accordance with the teachings of the present invention.

In FIG. 1 the pilot operated water valve 100 is shown in a cross-section in the closed position. Armature 102 is biased by spring 104 against pilot member 106 of insert 108 such that diaphragm 110 sealingly contacts main valve seat 112. As can be seen in this view, diaphragm 110 separates the internal valving cavity of the pilot operated water valve 100 into inlet chamber 114 and outlet chamber 116 situated respectively on either side of diaphragm 110. In the closed position, water entering inlet 118 may proceed into inlet chamber 114. This water may then pass through diaphragm 110 by way of a plurality of passageways 120 and 122 formed through diaphragm 110. However, one skilled in the art will recognize, in view of the present disclosure, that more or fewer passageways may be utilized.

As such, in the closed position, water entering inlet 118 is in fluid communication with both inlet chamber 114 and outlet chamber 116. Water in inlet chamber 114 that passes through diaphragm 110 by way of a plurality of passageways 120 and 122 then proceeds up bleed slots 126 and 128, which are located on opposite sides or otherwise on the periphery of insert 108. Such fluid then flows through bleed holes 130 and 132, at the top of bleed slots 126 and 128, respectively, into outlet chamber 116. During the closing process, diaphragm 110 rolls up (from the open state shown in FIG. 3) and closes around insert 108 creating a wiping action between diaphragm 110 and insert 108 that clears away any contaminants from bleed slots 126 and 128.

Figure 3:
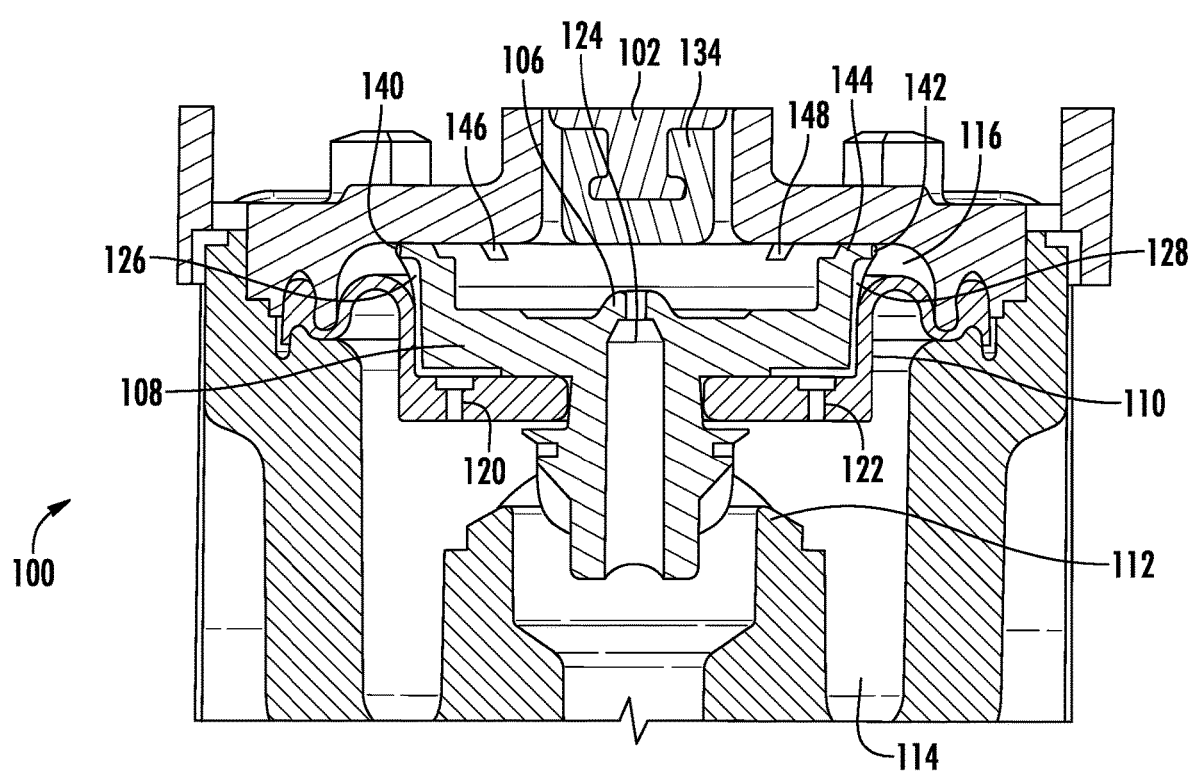
FIG. 3 is an enlarged partial cross sectional view of an embodiment of the pilot operated water valve of FIG. 1, shown in the open state.

However, once the outlet chamber 116 is filled with water in the closed position, further flow of water through water valve 100 is prevented because armature 102, and more particularly seal member 134 installed in an end of armature 102, seals off pilot passageway 124 through pilot member 106. Upon the application of electrical current to solenoid actuator 136, armature 102 is moved upward to unseat seal member 134 from pilot member 106. This exposes the uppermost opening of pilot passageway 124 to outlet chamber 116, which as discussed above will result in water valve 100 opening to outlet 138, as illustrated in FIG. 3.

Figure 2:
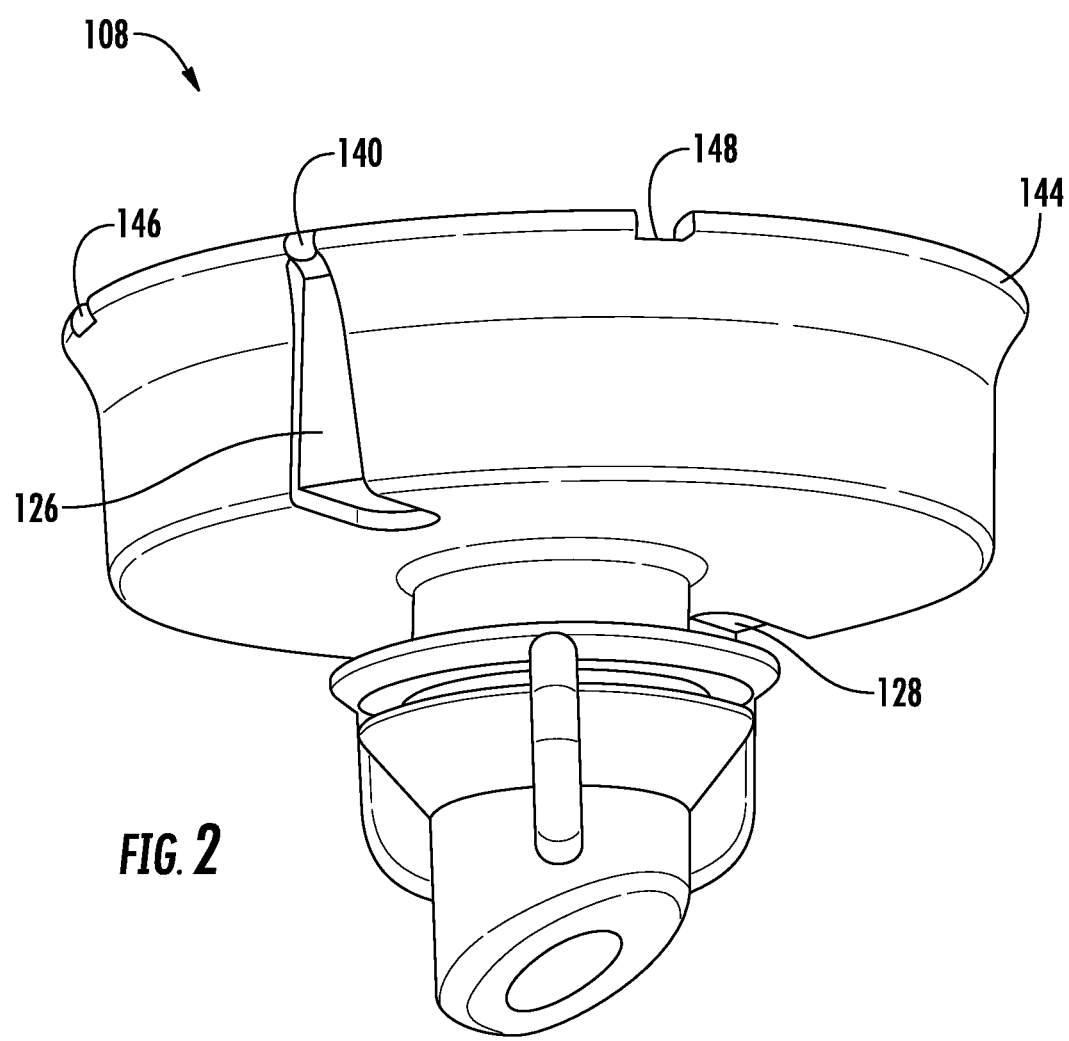
FIG. 2 is an isometric illustration of an embodiment of an insert of the present invention illustrating a tapered bleed slot and scallop of the pilot operated water valve of FIG. 1.

FIG. 2 illustrates one embodiment of insert 108. In this embodiment of insert 108, two identical bleed slots 126 and 128 are included and located on opposite sides of insert 108. As may be seen in this illustration of one embodiment, bleed slot 126 is tapered, large at the bottom and a specific size at the top. The size of the top of bleed slots 126 and 128 determines the ratio to center hole of pilot passageway 124 for opening, as shown in FIG. 1. That is, the rate of water flow that is allowed from the inlet chamber 114 to the outlet chamber 116 is governed by these and is less than the rate at which water flows out of the outlet chamber 116 through the pilot passageway 124 in order to allow the valve to open.

Located at the top of each bleed slots 126 and 128 is a scallop 140. Scallop 140 for bleed slot 126 can be seen in this illustration, while scallop 142 of bleed slot 128 can be seen in FIG. 3. The upper edge 144 of insert 108 also has notches 146 and 148 through which water can flow into the center of insert 108 (particularly when water valve 100 is open as shown in FIG. 3 when the upper edge 144 is in contact with the underside of the solenoid actuator 136). Insert 108 has four notches in one embodiment, two of which are not shown in this FIG. 2. However, one skilled in the art would recognize, in view of the present disclosure, that more or fewer notches may be utilized.

In the closed position, scallops 140 and 142 meet with the inner wall of diaphragm 110 to form bleed holes 130 and 132, respectively, as seen in FIG. 1. The increasing taper of bleed slots 126 and 128 allows in-rushing water to accelerate as it moves towards to narrower top of bleed slots 126 and 128. This increases the force with which the water exits through bleed holes 130 and 132, causing the water to flush out any contaminants that may have become stuck.

In FIG. 3, one embodiment of water valve 100 is shown in a cross-section in the opened position. For water valve 100 to be opened, electrical current must be applied to solenoid actuator 136. Upon the application of electrical current to solenoid actuator 136, armature 102 moves upward and unseats seal member 134 from pilot member 106 thereby exposing the uppermost opening of pilot passageway 124 to outlet chamber 116. Because the water in outlet chamber 116 is pressurized at the same pressure as that of the water in inlet chamber 114, and assuming the pressure through outlet 138 and pilot passageway 124 is less than that of inlet chamber 114, this water then proceeds to evacuate from outlet chamber 116 through pilot passageway 124 to outlet 138. This causes a pressure differential on either side of diaphragm 110 such that the pressure in inlet chamber 114 is greater than that of the pressure in outlet chamber 116. This pressure differential thus causes diaphragm 110 to unseat from main valve seat 112, thereby fully exposing the opening surrounded by main valve seat 112 to inlet chamber 114. This results in a full opening of water valve 100 allowing water to flow from inlet chamber 114 down to outlet 138.

Once armature 102 is activated, the water pressure against diaphragm 110 will cause diaphragm 110 and insert 108 to lift off of the main valve seat. As diaphragm 110 and insert 108 move upward, the movement upward of insert 108 and diaphragm 110 is restricted by the solenoid actuator 136. This upward movement causes diaphragm 110 to peel away from insert 108 as insert 108 continues to move upward until upper edge 144 of insert 108 contacts solenoid actuator 136. As diaphragm 110 does so, the scallops 140 and 142, as well as part of bleed slots 126 and 128, are opened and become exposed to the water in and incoming to outlet chamber 116. This creates a self-cleaning action which causes any contaminants that might have been stuck in bleed holes 130 and 132 (see FIG. 1) and bleed slots 126 and 128 to unstick and move out of scallops 140 and 142, and bleed slots 126 and 128, respectively.

The water in water valve 100 is also in fluid communication with inlet chamber 114 and outlet chamber 116 in the open position. In the open position, water in inlet chamber 114 may pass through diaphragm 110 by way of a plurality of passageways 120 and 122 then process up bleed slots 126 and 128 and flow into outlet chamber 116 through the exposed tops of bleed slots 126 and 128. From outlet chamber 116, water can flow through notches 146 and 148, on the upper edge of insert 108, into the center of insert 108. Once in the center of insert 108, the water can then flow through pilot passageway 124 to outlet 138 until the solenoid is de-energized to close the pilot passageway 124. As water fills the outlet chamber 116, the differential pressure acts to close the valve (as shown in FIG. 1).

Figure 4:
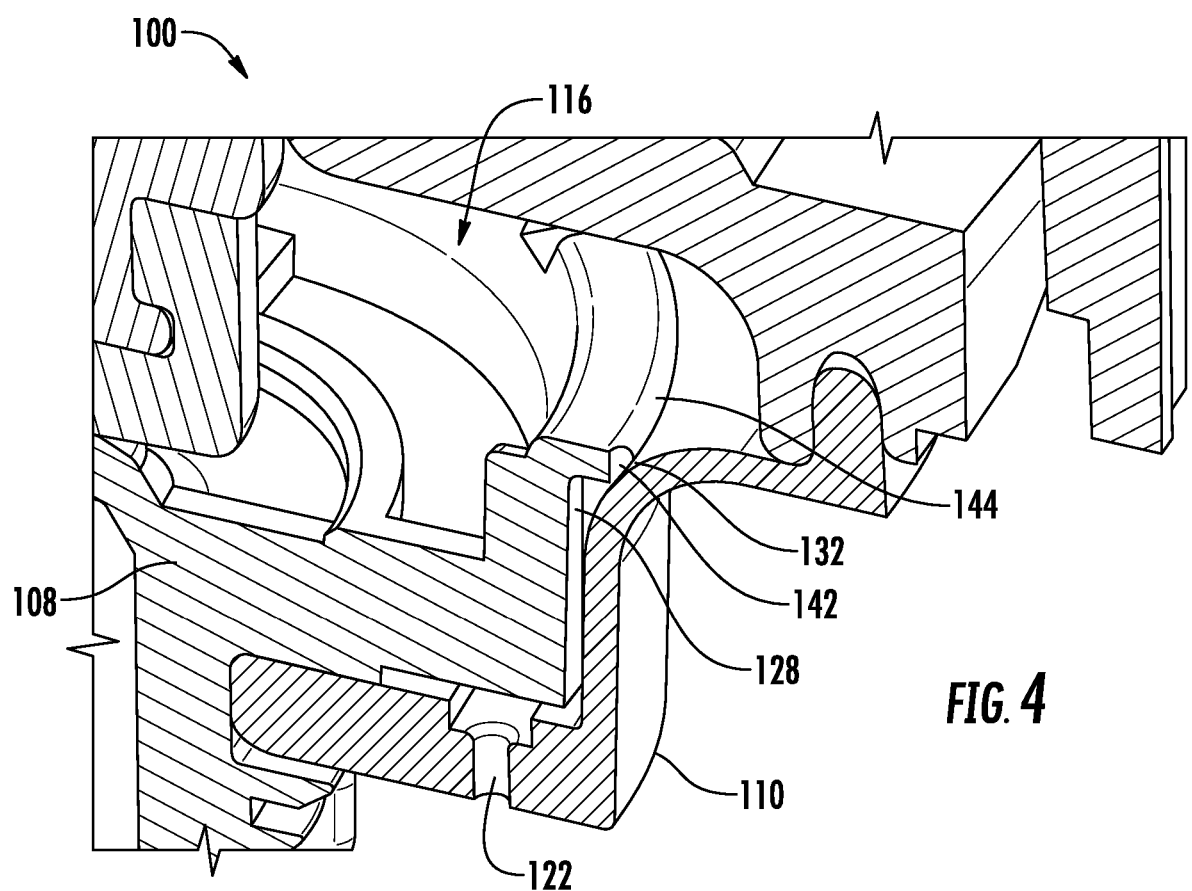
FIG. 4 is an enlarged partial cross sectional view of an embodiment of a bleed slot of the pilot operated water valve of FIG. 1, shown in the closed position.

FIG. 4 illustrates an enlarged view of bleed slot 128 of water valve 100 in the closed position. When water valve 100 is in the closed position, diaphragm 110 is closed around insert 108. Bleed slot 128 forms a passageway in conjunction with the inner wall of diaphragm 110. Scallop 142 on upper edge 144 of insert 108 contacts the inner wall of diaphragm 110 to form bleed hole 132. Due to the curvature of the inner wall of diaphragm 110 where contact is made with scallop 142, the outermost edge of bleed hole 132 is infundibular, which allows any contaminants that might have been stuck to be flushed out. Water travels through passageway 122 in diaphragm 110, along bleed slot 128 and into outlet chamber 116 through bleed hole 132.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pilot operated valve, comprising:
   a valve body having an inlet, an internal valving cavity, and an outlet;
   a main valving member positioned in the internal valving cavity and operable to control a main flow of water from the inlet to the outlet;
   wherein the main valving member includes a diaphragm positioned in the valve body to divide the internal valving cavity into an inlet chamber and an outlet chamber, and an insert operably coupled to and cooperating with the diaphragm; and wherein the diaphragm defines at least one passageway therethrough positioned to cooperate with at least one tapered bleed slot defined in an outer wall of the insert, the at least one tapered bleed slot narrowing in width between sidewalls of the at least one tapered bleed slot; and wherein the sidewalls of the at least one tapered bleed slot converge towards one another in a direction of fluid flow through the at least one tapered bleed slot.

2. The pilot operated valve of claim 1, wherein the insert further defines at least one scallop at an upper edge thereof, and wherein the at least one scallop cooperates with the diaphragm to form at least one bleed hole when the main valving member is in a closed position.

3. The pilot operated valve of claim 2, wherein the at least one passageway, the at least one tapered bleed slot, and the at least one bleed hole cooperate to provide fluid communication between the inlet chamber and the outlet chamber.

4. The pilot operated valve of claim 2, wherein the diaphragm defines a plurality of passageways therethrough positioned to cooperate with a plurality of tapered bleed slots defined in an outer wall of the insert, and wherein the insert further defines a plurality of scallops at an upper edge thereof that cooperate with the diaphragm to form a plurality of bleed holes when the main valving member is in a closed position.

5. The pilot operated valve of claim 2, wherein the diaphragm defines a first passageway and a second passageway therethrough positioned to cooperate with a first tapered bleed slot and a second tapered bleed slot, respectively, defined in an outer wall of the insert, and wherein the insert further defines a first scallop and a second scallop at an upper edge thereof that each cooperate with the diaphragm to form a first bleed hole and a second bleed hole when the main valving member is in a closed position.

6. The pilot operated valve of claim 5, wherein the first passageway, the first tapered bleed slot, and the first bleed hole cooperate to provide fluid communication between the inlet chamber and the outlet chamber, and wherein the second passageway, the second tapered bleed slot, and the second bleed hole cooperate to provide fluid communication between the inlet chamber and the outlet chamber.

7. The pilot operated valve of claim 2, wherein the diaphragm and the insert at least partially separate when the main valving member is in an open position to expose the scallop to the outlet chamber.

8. A pilot operated valve, comprising:
a valve body having an inlet, an internal valving cavity, and an outlet;
a main valving member positioned in the internal valving cavity and operable to control a main flow of water from the inlet to the outlet;
wherein the main valving member includes a diaphragm positioned in the valve body to divide the internal valving cavity into an inlet chamber and an outlet chamber, and an insert operably coupled to and cooperating with the diaphragm;
wherein the diaphragm defines at least one passageway therethrough positioned to cooperate with at least one tapered bleed slot defined in an outer wall of the insert, the at least one tapered bleed slot narrowing in width between sidewalls of the at least one tapered bleed slot;
wherein the sidewalls of the at least one tapered bleed slot converge towards one another in a direction of fluid flow through the at least one tapered bleed slot;
wherein the insert further defines at least one scallop at an upper edge thereof, and wherein the at least one scallop cooperates with the diaphragm to form at least one bleed hole when the main valving member is in a closed position; and
wherein an infundibular shape is formed between a curvature of an inner wall of the diaphragm and the scallop of the insert where the scallop contacts the curvature of the inner wall of the diaphragm to form the at least one bleed hole.

9. The pilot operated valve of claim 8, wherein the tapered bleed slot has a first width proximal the passageway through the diaphragm and a second width distal the passageway through the diaphragm.

10. The pilot operated valve of claim 8, wherein the tapered bleed slot is configured such that a flow of fluid therethrough from the inlet chamber to the outlet chamber accelerates so as to aid in clearing out any trapped contaminants in the tapered bleed slot.

11. The pilot operated valve of claim 8, wherein the diaphragm and the insert at least partially separate when the main valving member is in an open position to expose the tapered bleed slot to the outlet chamber.

12. The pilot operated valve of claim 11, wherein the diaphragm rolls up to contact the outer wall of the insert when the main valving member is transitioning from the open position to the closed position thereby creating a wiping action to flush any trapped debris from the tapered bleed slot.

13. A pilot operated valve, comprising:
a valve body having an inlet, an internal valving cavity, and an outlet;
a main valving member positioned in the internal valving cavity and operable to control a main flow of water from the inlet to the outlet;
wherein the main valving member includes a diaphragm positioned in the valve body to divide the internal valving cavity into an inlet chamber and an outlet chamber, and an insert operably coupled to and cooperating with the diaphragm; and
wherein the diaphragm defines at least one passageway therethrough positioned to cooperate with at least one tapered bleed slot defined in an outer wall of the insert, the at least one tapered bleed slot narrowing in width between sidewalls of the at least one tapered bleed slot;
wherein the sidewalls of the at least one tapered bleed slot converge towards one another in a direction of fluid flow through the at least one tapered bleed slot;
wherein the upper edge of the insert further defines at least one notch configured to allow water flow into a cupped base of the insert when the main valving member is in an open position.

14. A valve, comprising:
a valve body having an inlet, an internal valving cavity, and an outlet;
a main valving member positioned in the internal valving cavity and operable to control a main flow of water from the inlet to the outlet;
wherein the main valving member includes a diaphragm positioned in the valve body to divide the internal valving cavity into an inlet chamber and an outlet chamber, and an insert operably coupled to and cooperating with the diaphragm; and
wherein the insert defines a tapered bleed slot in an outer wall thereof and a scallop that is concave and located at a respective end of the tapered bleed slot at an upper edge of a flange of the insert and wherein the scallop cooperates with the diaphragm to form a bleed hole when the main valving member is in a closed position.

15. The valve of claim 14, wherein the diaphragm defines a passageway therethrough.

16. The valve of claim 15, wherein the passageway, the bleed slot, and the bleed hole cooperate to provide fluid communication between the inlet chamber and the outlet chamber.

17. The valve of claim 16, wherein the bleed slot is tapered from the passageway to the scallop.

18. The valve of claim 15, wherein the diaphragm defines a plurality of passageways therethrough, and wherein the insert defines a plurality of scallops that cooperate with the diaphragm to form a plurality of bleed holes.

19. A pilot operated water valve, comprising:
a valve body having an inlet, an internal valving cavity, and an outlet;
a main valving member positioned in the internal valving cavity and operable to control a main flow of water from the inlet to the outlet, the main valving member including a diaphragm and an insert operably coupled to and cooperating with the diaphragm, the diaphragm defining a pair of passageways therethrough positioned on opposite sides thereof, the insert defining a pair of tapered bleed slots in an outer wall thereof and a pair of scallops that are concave, each one of the pair of scallops located at a respective end of one of the pair of tapered bleed slots at an upper edge of a flange of the insert, the pair of scallops cooperate with the diaphragm to form a pair of bleed holes when the main valving member is in a closed position, and the pair of passageways, the pair of tapered bleed slots, and the pair of bleed holes being aligned, respectively, to provide fluid communication through the main valving member.

20. The pilot operated water valve of claim 19, wherein the diaphragm and the insert at least partially separate when the main valving member is opened to expose the pair of tapered bleed slots and the pair of scallops, and wherein the diaphragm rolls up to contact the insert when the main valving member is closed to create a wiping action to flush any trapped debris from the tapered bleed slot.

* * * * *